United States Patent [19]

Beyer et al.

[11] Patent Number: 4,546,955
[45] Date of Patent: Oct. 15, 1985

[54] TWO-STAGE SOLENOID VALVE

[75] Inventors: Kenneth E. Beyer, West Hartford; Wilhelm H. Horlacher, Newington, both of Conn.

[73] Assignee: Honeywell Inc., Minneapolis, Minn.

[21] Appl. No.: 434,305

[22] Filed: Oct. 14, 1982

[51] Int. Cl.⁴ ............................................. F16K 31/06
[52] U.S. Cl. ............................ 251/129.15; 251/129.10; 335/267; 335/268
[58] Field of Search ................ 251/137, 129; 335/267, 335/268

[56] References Cited

U.S. PATENT DOCUMENTS

| 2,901,210 | 8/1959 | Hebard | 251/137 |
| 3,421,546 | 1/1969 | Jennings et al. | 251/129 X |
| 3,424,429 | 1/1969 | Monnich | 251/129 |
| 3,623,583 | 11/1971 | Shimanckas | 335/268 |
| 4,056,255 | 11/1977 | Lace | 251/137 X |
| 4,342,443 | 8/1982 | Wakeman | 251/137 |
| 4,361,309 | 11/1982 | Sogabe | 251/137 |

FOREIGN PATENT DOCUMENTS

| 2809701 | 9/1979 | Fed. Rep. of Germany | 251/137 |
| 2273213 | 12/1975 | France . | |
| 177477 | 11/1982 | Japan . | |

*Primary Examiner*—Arnold Rosenthal
*Attorney, Agent, or Firm*—Mitchell J. Halista; Trevor B. Joike

[57] ABSTRACT

A two-stage solenoid valve uses a pair of stacked coaxial armatures separated by a predetermined gap which is maintained by a first spring therebetween. A coaxial connecting rod extends between a first armature and the second armature and is attached to the first armature. A head on the unattached end of the rod bears against a bottom surface of a recess in the second armature to limit the expansion of the first spring. A second spring is arranged to contact the head of the rod and to extend therefrom to a fixed plug in the end of a cylindrical housing surrounding the first and second armatures. The first armature is provided with a fluid sealing surface on a first end for sealing an adjacent fluid port in the valve in response to the spring force exerted by the second spring. A first and a second solenoid coil assembly are coaxially stacked to surround the cylindrical sleeve housing adjacent to respective ones of the first and second armatures. The coils are connected in series with a center tap connection therebetween to allow either parallel or single coil energization. Selective energization of the first and second electromagnetic solenoid coil assemblies is used to control the positioning of the first and second armatures to provide a first and a second spacing of the sealing surface from the orifice during an open state of the valve to provide a first and a second flow rate, respectively, through the valve.

8 Claims, 4 Drawing Figures

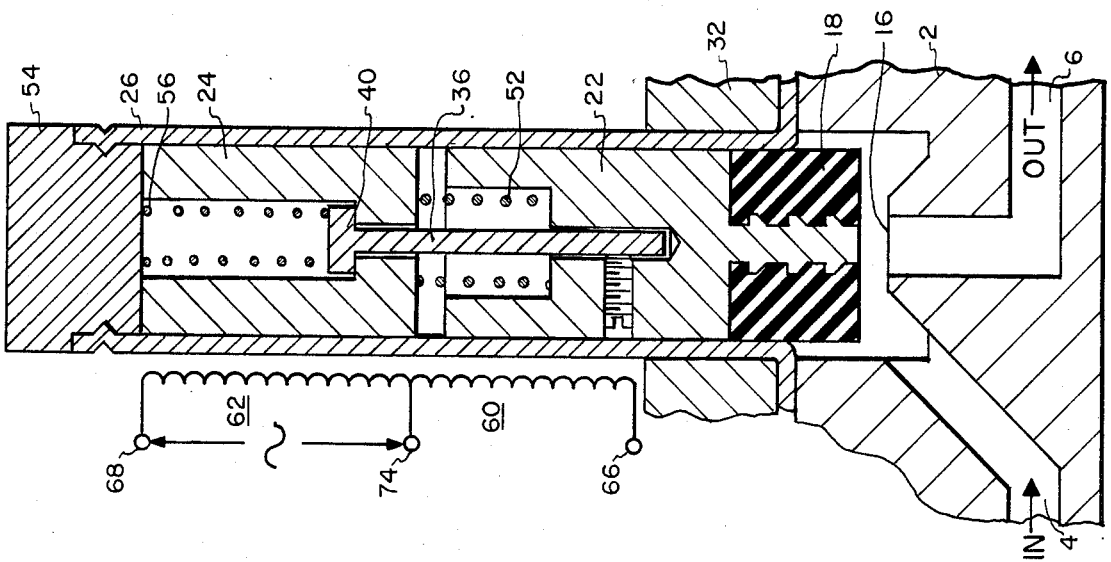
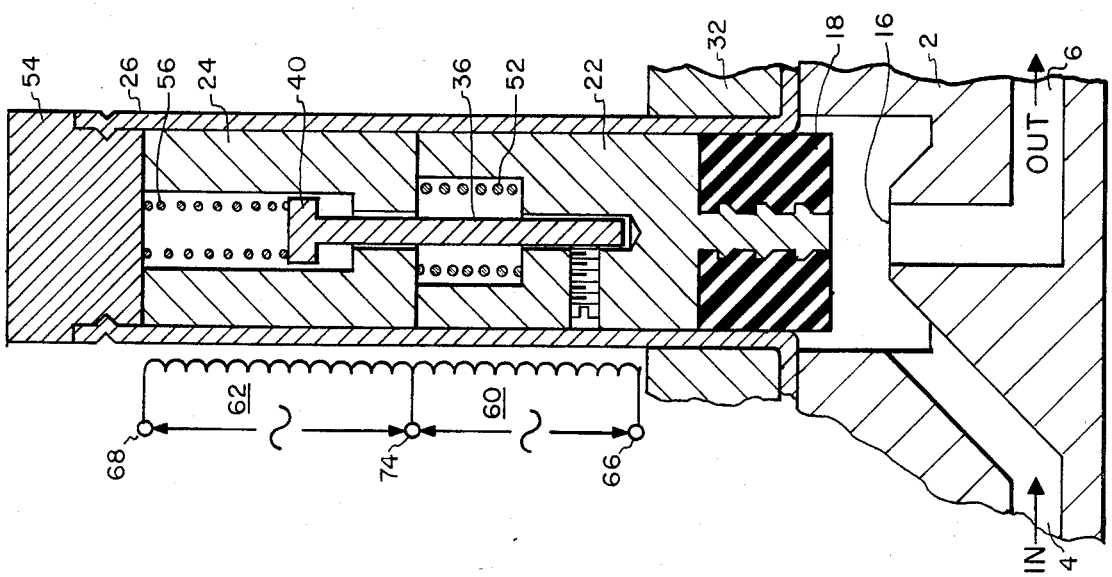
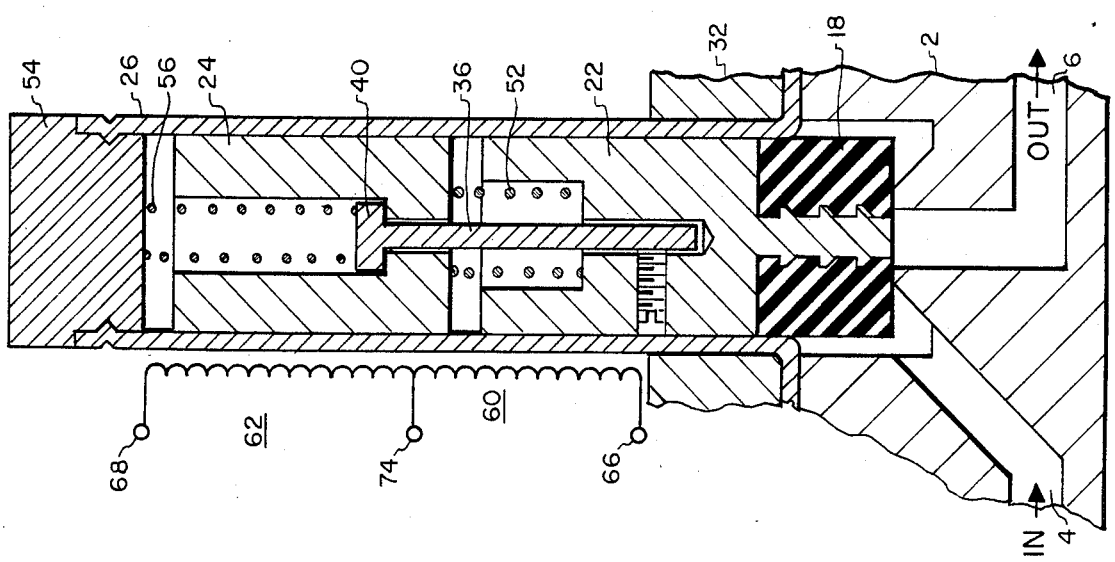

/ 4,546,955 /

TWO-STAGE SOLENOID VALVE

BACKGROUND OF THE INVENTION

1. Field of the Invention

The present invention is directed to solenoid actuators. More particularly, the present invention is directed to a two-stage solenoid valve for selectively providing a first and a second flow rate therethrough.

2. Description of the Prior Art

Prior attempts to provide two different flow rates have included the use of two valves in parallel flow lines with a selective actuation of the valves which may have had different size flow control orifices. Another prior art solution to the problem used a single orifice valve with a single coil and armature and a half-wave rectified alternating current (AC) input energizing signal. The energizing signal produced an oscillation of the armature at a fixed frequency to produce a reduced flow rate relative to a non-oscillatory fully open position of the armature produced by a non-rectified energizing signal. These prior art approaches have inherent disadvantages such as chatter at reduced flow in the case of the oscillating armature and increased cost of the extra valve and plumbing in the case of the dual valve. Accordingly, in order to overcome the aforesaid shortcomings of the prior art, it is desirable to provide a valve having a selectively variable flow rate while exhibiting a quiet operation and direct operation on alternating current (AC) and direct current (DC).

SUMMARY OF THE INVENTION

An object of the present invention is to provide an improved solenoid valve for selectively providing a first and a second flow rate therethrough.

In accomplishing this and other objects, there has been provided, in accordance with the present invention a two-stage solenoid valve having a fluid orifice, a sealing means for sealing said orifice means, armature means for urging said sealing means toward said orifice means said armature means including a first and second armature, a fixed stop means and a first resilient means for establishing a gap between said stop means and said first and second armatures and solenoid drive means for selectively establishing in response to first and second energizing signals corresponding first and second positions of said armature means to provide a first and a second spacing, respectively, of said sealing means with respect to said orifice means to effect a corresponding first and a second flow rate through the valve, said drive means including first actuating means for eliminating said gap to establish said first position of said sealing means in response to said first energizing signal.

BRIEF DESCRIPTION OF THE DRAWINGS

A better understanding of the present invention may be had when the following detailed description is read in connection with the accompanying drawings, in which, FIGS. 2A, 2B, and 2C are simplified cross-sectional illustrations of the valve shown in FIG. 1 and illustrating a sequence of operations thereof.

DESCRIPTION OF THE PREFERRED EMBODIMENT

Detailed Description

Figure 1:
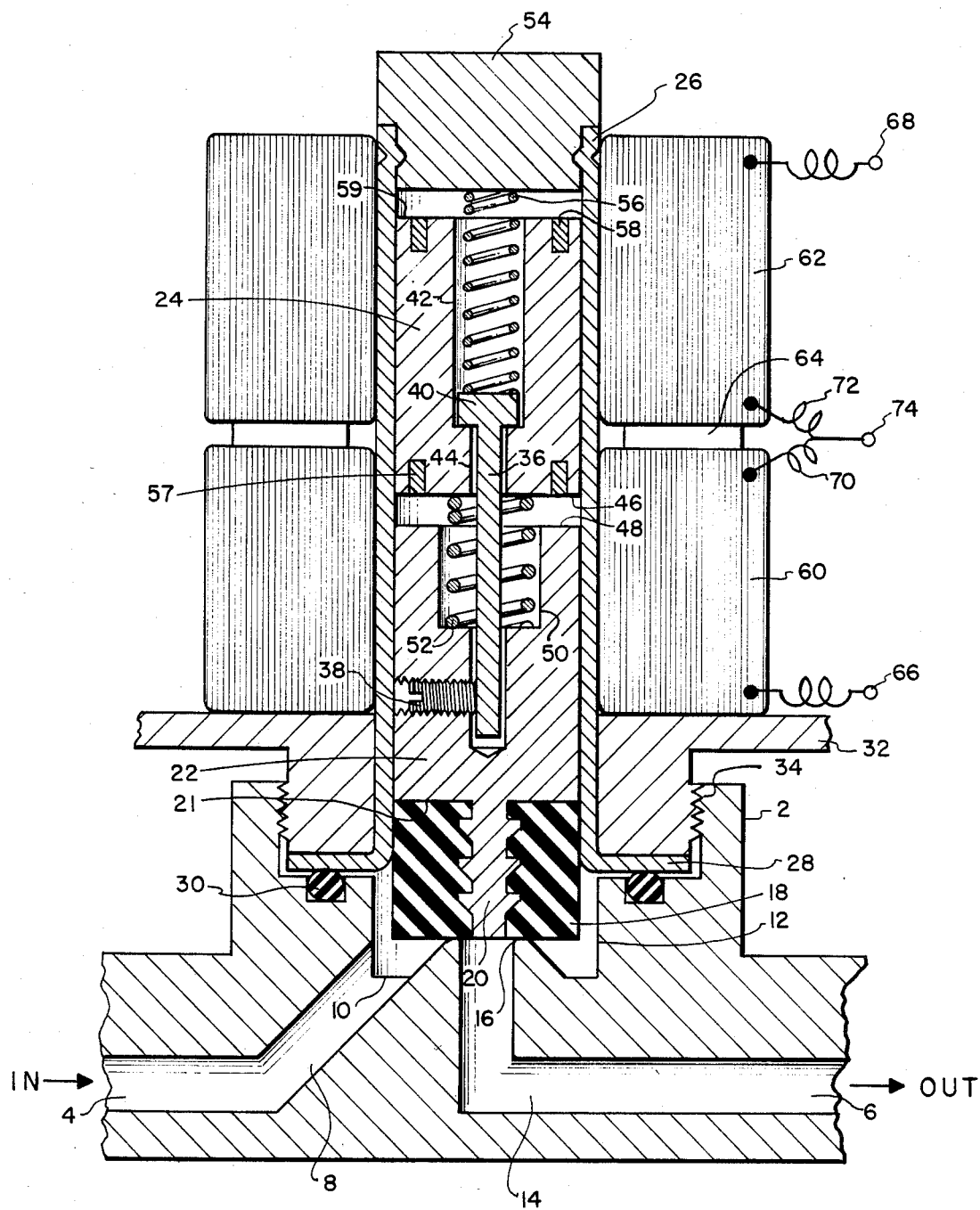
FIG. 1 is a cross-sectional illustration of a two-stage solenoid valve embodying an example of the present invention.

Referring to FIG. 1 in more detail, there is shown a cross-sectional pictorial illustration of a two-stage solenoid valve embodying an example of the present invention and having a valve body 2 with a fluid inlet port 4 and a fluid contact port 6. The fluid inlet port 4 is connected to a fluid inlet passage 8 in the valve body 2 terminating in a first inner fluid orifice 10 communicating with a recess 12 of the valve body 2. Similarly, the fluid outlet port 6 is connected to a fluid passage 14 in the valve body 2 which connects the fluid outlet port 6 to a second internal fluid orifice 16.

A fluid sealing ring 18 is coaxially mounted on a coaxial extension 20 projecting from a first end face 21 of a first valve armature 22 and is arranged to seal the orifice 16 in a closed condition of the valve. The first armature 22 is arranged coaxially with a second armature 24 within a cylindrical sleeve 26. An internal first end 28 of the sleeve 26 is provided with an outwardly extending peripheral flange which may be sealed to the valve body 2 by a suitable fluid sealing means, e.g., an O-ring 30. The flange 28 is retained against the O-ring 30 by a valve cover 32, shown partially in FIG. 1, having a threaded connection 34 with the valve body 2.

A connecting rod 36 is coaxially anchored in the first armature 22 by a suitable means, e.g., a set screw 38, extending from the side of the first armature 22 and bearing against a first end of the connecting rod 36. The second or free end of the connecting rod 36 is provided with a head 40 located in a coaxial recess 42 in the second armature 24. The body of the connecting rod 36 extends through a hole 44 connecting the recess 42 with a first end face 46 of the second armature 24. A second end face 48 of the first armature 22 is arranged to face the first end face 46 of the second armature 24 and has a coaxial recess 50 therein surrounding the connecting rod 36. A first spring 52 is located within the recess 50 and extends between the bottom of the recess 50 and the first end face 46 of the second armature 24. A magnetic material end plug 54 is retained in the sleeve 26 to seal the second end of the cylindrical sleeve 26 and to provide a magnetic flux path. A second spring 56 extends between the plug 54 and the head 40 of the connecting rod 36 to urge the sealing ring 18 against the orifice 16. A first copper shading ring 57 is provided in the first end face 46 of the second armature 24 and a second copper shading ring 58 is provided in the second end face 59 of the second armature 24.

A first solenoid coil assembly 60 in the form of an annulus surrounding a portion of the sleeve 26 is positioned next to the cover 32. A second solenoid coil assembly 62 in the form of an annulus is spaced from the first coil assembly 60 by a non-magnetic spacer 64 and is also arranged to surround a portion of the cylindrical sleeve 26. The first and second solenoid coil assemblies 60, 62 are shown in a simplified form in FIG. 1 and may each include an electromagnetic winding and a magnetic field structure. The first solenoid coil 60 is provided with a first electrical connection 66 to one end thereof while the second solenoid coil 62 is provided with a first electrical connection 68 to one end thereof. A second electrical connection 70 for the other end of the first coil 60 is connected to a second electrical connection 72 for the other end of the second coil assembly 62 and to a common electrical connection 74 forming a center tap between the first and second coil assemblies 60, 62.

The valve illustrated in FIG. 1 is shown in a closed state wherein the sealing ring 18 is positioned against the orifice 16 by the spring 56 acting through the connecting rod 36 and the attached first armature 22 to seal the fluid path through the valve body between the inlet port 4 and the outlet port 6. In this position the first armature 22 is located at the bottom of the sleeve 26 while the second armature 24 is spaced from the first armature 22 to provide a gap between the end faces 46, 48 by the intermediate spring 52 which positions the second armature 24 until the head 40 of the connecting rod 36 contacts the bottom of the recess 42 in the second armature 24. Concurrently, the spring 56 is effective to keep the second end face 59 of the second armature 24 spaced from the plug 54.

In FIGS. 2A, 2B, and 2C there are shown simplified cross-sectional representations of the valve shown in FIG. 1 to illustrate progressive stages in the operation of the valve to provide a first and a second flow rate. FIG. 2A shows the valve in the same closed condition illustrated in FIG. 1. FIG. 2B shows a fully opened or first state of the valve to provide a maximum or first flow rate through the valve body between the inlet port 4 and the outlet port 6. This fully open state is achieved by energizing the first and second solenoid coils 60, 62 from respective AC or DC sources, not shown, to effect a repositioning of the armatures 22, 24 from the position shown in FIG. 2A. Specifically, the second armature 24 is elevated to a position wherein the second end face 59 bears against the plug 54 while compressing the spring 56. Concurrently, the first armature 22 is elevated to a position bringing the second surface 48 thereof against the first surface 46 of the second armature 24 while compressing the spring 52 and further compressing the spring 56. In this position of the armatures 22, 24, the head 40 of the connecting rod 36 is lifted from the bottom of the recess 42 in the second armature 24. This position of the first and second armatures 22, 24 is effective to separate the sealing ring 18 from the orifice 16 by a maximum distance to achieve a maximum flow rate through the valve.

To effect a lower or second flow rate through the valve as shown in FIG. 2C in a second state of the valve, only the second solenoid coil 62 is energized to raise or position the second armature 24 against the plug 54 while compressing the spring 56. Inasmuch as the first solenoid coil 60 is not energized during this operation, the position of the first armature 22 is dependent on the action of the connecting rod 36 wherein the head 40 of the connecting rod 36 is retained against the bottom of the recess in the second armature 24 while the spring 52 maintains the spacing between the first and the second armatures 22, 24 by allowing the spring 52 to remain in an expanded state. This position of the second armature 22 separates the sealing ring 18 from the orifice 16 by a smaller distance than that available for a maximum flow rate as shown in FIG. 2B. Thus, the flow rate in the second state operation of the valve as illustrated in FIG. 2C is less than the flow rate achieved in the first state operation of the valve as shown in FIG. 2B.

Accordingly, it may be seen that there has been provided, in accordance with the present invention an improved two-stage solenoid valve for selectively providing a first and a second flow rate.

The embodiments of the invention in which an exclusive property or privilege is claimed are defined as follows:

1. A two-stage solenoid valve comprising
orifice means for providing a fluid path,
sealing means for sealing said orifice means,
armature means for urging said sealing means toward said orifice means, said armature means including a first and a second armature, a fixed stop means and a first resilient means for establishing a gap between said stop means and said first and said second armatures, said first and second armatures being coaxial and
solenoid drive means for selectively establishing in response to first and second energizing signals corresponding first and second positions of said armature mean to provide a first and a second spacing, respectively, of said sealing means with respect to said orifice means to effect a corresponding first and a second flow rate through the valve, said drive means including first actuating means for eliminating said gap to establish said first position of said sealing means in response to said first energizing signal, wherein said armature means includes a connecting rod extending between said first and second armatures, means attaching one end of said rod to said second armature and means allowing said first armature to slide on said rod, said rod having a head on a second end thereof bearing against a first end of said first resilient means with a second end of said first resilient means contacting said fixed stop means,
wherein said armature means includes a second resilient means for establishing a gap between said first and said second armatures and said drive means includes second actuating means for eliminating said gap between said armatures in response to said second energizing signals to establish in combination with said first actuating means said second position of said sealing means.

2. A valve as set forth in claim 1 wherein said rod is coaxial with said first and second armatures.

3. A valve as set forth in claim 1 wherein said first and second resilient means include respective coil springs.

4. A valve as set forth in claim 1 wherein said sealing means includes a fluid sealing ring attached to said armature means.

5. A valve as set forth in claim 1 wherein said first actuating means includes a first solenoid coil assembly and second actuating means includes a second solenoid coil assembly, said first armature being responsive to an energization of said first solenoid assembly and second armature being responsive to an energization of said second solenoid coil assembly.

6. A valve as set forth in claim 1 wherein said sealing means includes a resilient surface located on an outside surface of said second armature facing said orifice means.

7. A valve as set forth in claim 4 wherein said first resilient means is arranged to urge said resilient surface against said orifice means during a non-energized state of said drive means.

8. A valve as set forth in claim 1 wherein said armature means includes a housing means for maintaining the coaxial relationship of said first and second armatures and for coaxially aligning said first and second solenoid coils.

* * * * *